(12) United States Patent
Peterson

(10) Patent No.: US 12,085,115 B2
(45) Date of Patent: Sep. 10, 2024

(54) LOCKING CARABINER

(71) Applicant: Derek Peterson, Elk Ridge, UT (US)

(72) Inventor: Derek Peterson, Elk Ridge, UT (US)

( * ) Notice: Subject to any disclaimer, the term of this patent is extended or adjusted under 35 U.S.C. 154(b) by 660 days.

(21) Appl. No.: 17/341,065

(22) Filed: Jun. 7, 2021

(65) Prior Publication Data
US 2021/0381542 A1 Dec. 9, 2021

Related U.S. Application Data

(60) Provisional application No. 63/035,550, filed on Jun. 5, 2020.

(51) Int. Cl.
*F16B 45/02* (2006.01)
*A63B 29/02* (2006.01)

(52) U.S. Cl.
CPC ............ *F16B 45/027* (2021.05); *A63B 29/02* (2013.01); *F16B 45/023* (2021.05); *F16B 45/035* (2021.05)

(58) Field of Classification Search
CPC .... F16B 45/023; F16B 45/024; F16B 45/026; F16B 45/027; F16B 45/029; F16B 45/032; F16B 45/035; B66C 1/36; A63B 29/02
USPC ........................................... 294/82.19, 82.21
See application file for complete search history.

(56) References Cited

U.S. PATENT DOCUMENTS

| | | | | |
|---|---|---|---|---|
| 316,870 A | * | 4/1885 | Braunfeld | |
| 731,162 A | * | 6/1903 | Carter | |
| 1,149,394 A | * | 8/1915 | Morrissey et al. | A62B 1/14 188/65.3 |
| 1,278,494 A | * | 9/1918 | Nesbit | B66C 1/36 24/600.2 |
| 1,610,985 A | * | 12/1926 | Vea | F16B 45/022 70/459 |
| 1,709,235 A | * | 4/1929 | Shaffer | F16B 45/037 24/375 |
| 5,287,645 A | * | 2/1994 | Gois | A01K 73/12 24/579.11 |
| 6,718,601 B1 | * | 4/2004 | Choate | F16B 45/029 24/600.2 |
| 7,228,601 B2 | | 6/2007 | Thompson | |
| 7,475,456 B2 | | 1/2009 | Thompson | |
| 7,636,990 B1 | * | 12/2009 | Choate | F16B 45/027 24/600.1 |
| 7,996,962 B2 | * | 8/2011 | Peterson | F16B 45/02 24/165 |
| 9,267,535 B2 | * | 2/2016 | Jang | A01K 75/00 |
| 9,322,428 B2 | * | 4/2016 | Perner | F16B 45/023 |
| 2014/0245576 A1 | | 9/2014 | Perner | |

FOREIGN PATENT DOCUMENTS

EP 2848829 B1 8/2014

* cited by examiner

*Primary Examiner* — Dean J Kramer
(74) *Attorney, Agent, or Firm* — Dentons Durham Jones Pinegar; Sarah W. Matthews; Landon Laycock

(57) ABSTRACT

A climbing instrument that comprises a first ring, a second ring that is larger than and engaged with the first ring. The second ring may comprise a gate that traverses a portion of the second ring and a rotatable cylinder that is positioned opposite the first ring and integrated within the second ring. The climbing instrument may also comprise a plurality of curved protrusions connected to and extending out and away from at least one of the first ring and the second ring.

16 Claims, 4 Drawing Sheets

LOCKING CARABINER

CROSS REFERENCE TO RELATED APPLICATION

A claim for priority to the Jun. 5, 2020 filing date of U.S. Provisional Patent Application No. 63/035,550, titled LOCKING CARABINER (the "'550 Provisional application"), is hereby made pursuant to 35 U.S.C. § 119(e). The entire disclosure of the '550 Provisional application is hereby incorporated herein.

TECHNICAL FIELD

This disclosure relates generally to various embodiments of a climbing tool which may also be a belay tool. More specifically, it relates to a climbing tool with a first ring, a second ring engaged with the first ring, the second ring including a gate traversing a portion of the second ring and a rotatable cylinder positioned opposite the first ring and integrated within the second ring. This instrument may be used for various purposes including, but not limited to, rock climbing, belaying, climbing trees for tree care and tree maintenance, and various types of construction projects. The features disclosed herein are numerous in nature and may be employed in various different ways to provide the same or similar results.

BACKGROUND

Various forms of climbing and belay equipment are needed for workers who climb trees for tree maintenance, workers who climb poles to install or repair telephone equipment, rock climbers, and others. As a result, many climbing and belay instruments have been designed to protect a user from injury. Such safety equipment typically includes a safety harness to be worn by a climber or worker and various forms of fall protection equipment. Climbing and fall protection equipment may include carabiners and figure 8 belay instruments.

A carabiner is very commonly used by the workers and climbers described above. The carabiner may include a gate that may be opened to engage the user's safety harness or a climbing rope or both. The gate will typically remain closed by a spring and a locking mechanism that is intended to keep the gate closed until the user desires to open it. The carabiner may, however, be inadvertently opened during use, particularly if the carabiner is being used to engage one or more harnesses or ropes. Some carabiners may also contain a small pulley system to allow the user to hoist a load or multiple loads up and down while climbing.

A figure 8 belay instrument is also very commonly used by the workers and climbers described above. A traditional figure 8 may comprise a metal body that has two rings that engage one another to form a figure 8 like shape. The user may attach one of the rings to a carabiner and thread a rope through the other loop in a manner that enables the user to rappel in a controlled manner.

SUMMARY

This disclosure relates to the use of a climbing tool which may also be a belay tool—which generally resembles a figure 8 climbing tool that may also be a belay tool—that incorporates additional structural and design features in order to improve the utility and safety of the instrument. More specifically, the instrument utilizes different concepts, designs, and features that may provide greater convenience and safety to a user than current or pre-existing tools on the market.

The instrument may prevent various risks of harm through various structural and design features so that users can safely perform various climbing-related functions with a single tool. Similar to a traditional figure 8 climbing/belay tool, the instrument in this disclosure may contain two separate rings or loops that are connected by an intermediate portion of the tool, which may be elongated, so that the instrument as a whole generally resembles a figure 8-like shape.

One (or both) of these rings may contain a gate that may be pivoted from a closed position to an open position in order to facilitate, for example, engaging fixed climbing ropes or a climbing harness with the instrument. This gate may also contain various types of locking mechanisms in order to prevent the gate from opening on accident or in an unintended manner. Users of the instrument may manipulate the locking mechanism to move the gate from a locked, closed position to an unlocked and open position. The gate and locking mechanism may be straight so as to allow for a twisting, triple-lock type of lock mechanism, or they may be convex and curved to conform to the contours of the ring(s).

The instrument may also contain various physical protrusions or extensions—that may be used in conjunction with climbing ropes for various climbing-related purposes. These protrusions may be curved or "bent" at different angles and positioned at various locations along the perimeter of the instrument in positions that may maximize their utility.

Additionally, the instrument may also contain a pulley system. The pulley system may be incorporated into one of the rings of the instrument in such a way that a user may engage the pulley by threading a rope through the ring that contains the pulley system. Incorporating a pulley system might affect the structural integrity of the instrument. So, it may be desirable to reinforce the portion of the instrument that surrounds the pulley system to maintain sufficient structural integrity for the uses of the instrument. This can be done in various ways. For example, the portion of the ring that the pulley system is incorporated into may be thicker, denser, and or strengthened with a separate reinforced component that may be coupled to the ring around the pulley system. In this way, the instrument may maximize its utility and still maintain the structural integrity needed to hoist and or carry heavy loads.

Climbers commonly use both carabiners and figure 8 climbing/belay tools in conjunction with one another, climbing harnesses, and climbing ropes to perform many different functions, such as: securing their climbing harnesses to a vertical climbing surfaces, securing various tools and or baggage to their climbing harnesses, etc.

Additionally, to perform certain climbing-related functions, climbers also frequently need to use a single instrument, such as a carabiner, to engage various climbing ropes and a harness at the same time. Because typical carabiners only contain a single ring or loop, engaging a harness and multiple ropes at the same time may create unwanted interactions between the carabiner, the harness, and the ropes. For example, this may cause undesired friction between the harness and the rope(s). Such friction between these different components can be dangerous. These interactions between the carabiner, the harness, and the ropes may also block or jam parts of the equipment that may cause the carabiner to remain open or open unintentionally, which can be dangerous and potentially even fatal. Additionally, the carabiner, the harness, and the ropes may tilt or press and turn a locking mechanism in such a way that even a triple-lock unintentionally opens.

Because the instrument described in this disclosure contains multiple separate rings—in addition to the other aforementioned features—users may be able to prevent some of the unwanted interactions between their equipment listed above and therefore avoid some of the risks associated with such interactions. In short, the instrument described in this application may allow climbers to perform various climbing-related functions with a single instrument in a safer and more convenient way.

Other aspects, as well as features and advantages of various aspects of the disclosed subject matter will become apparent to one of ordinary skill in the art from the ensuing description, the accompanying drawings, and the appended claims.

DETAILED DESCRIPTION

Figure 1:
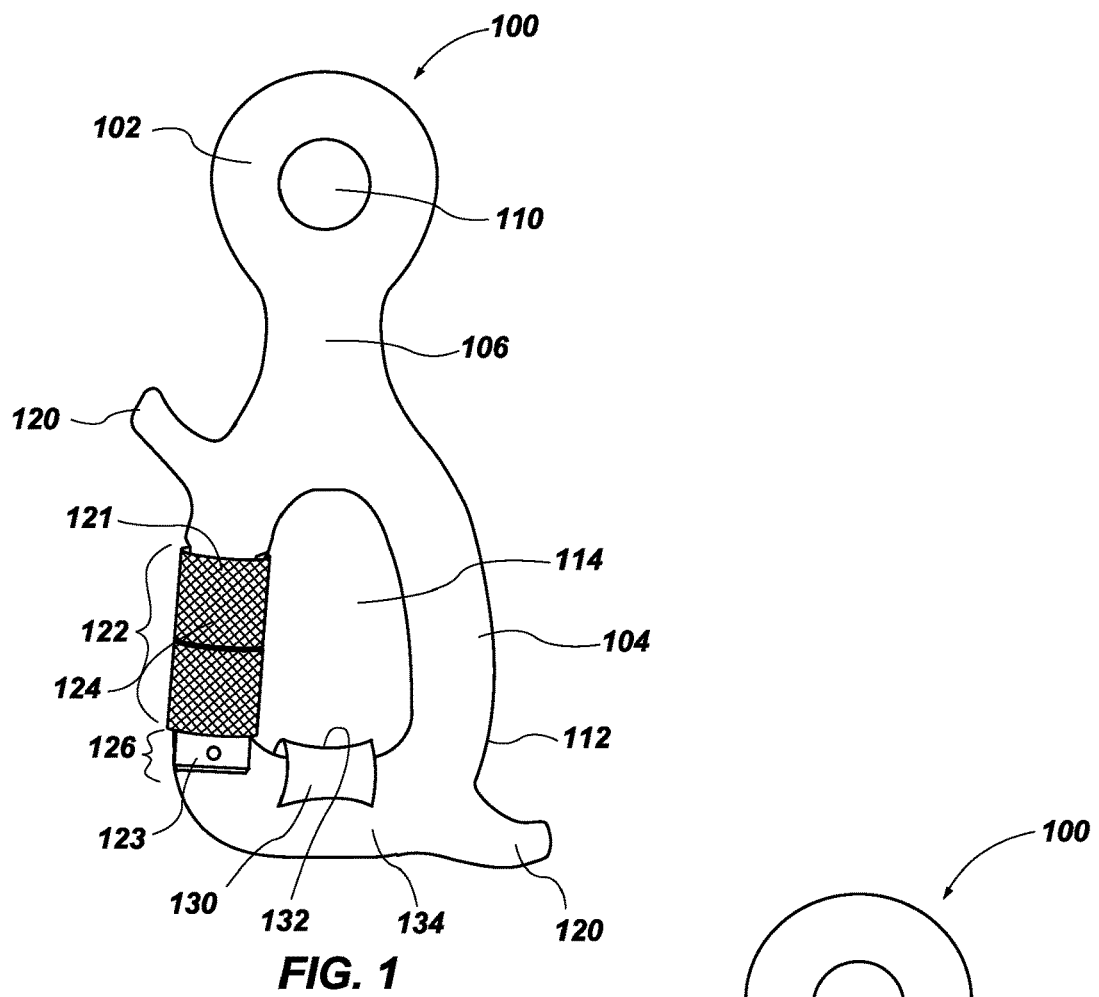
FIG. 1 is a top view of a tool with a first ring, a second ring engaged to the first ring, and a gate, with the gate in a first configuration.
Figure 2:
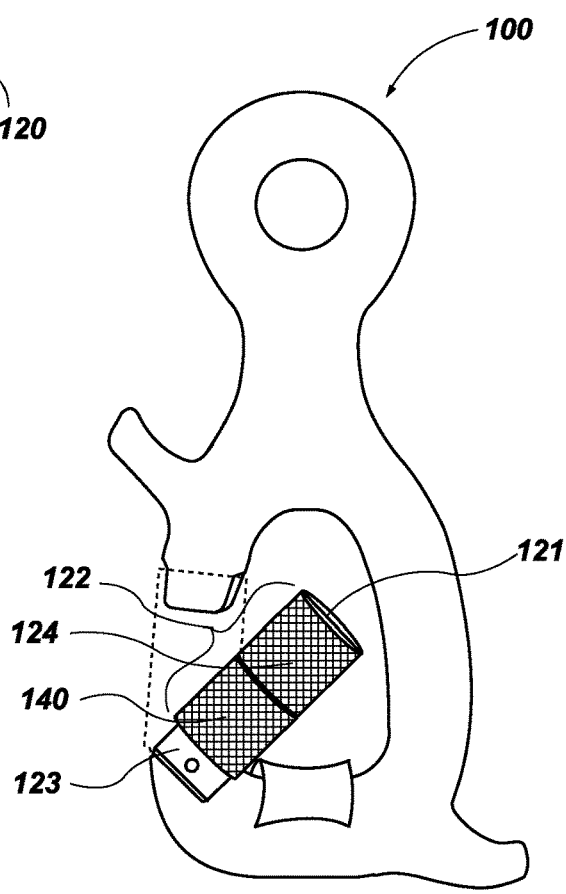
FIG. 2 is a top view of the tool of FIG. 1, in which the gate is in a second, open, configuration.
Figure 3:
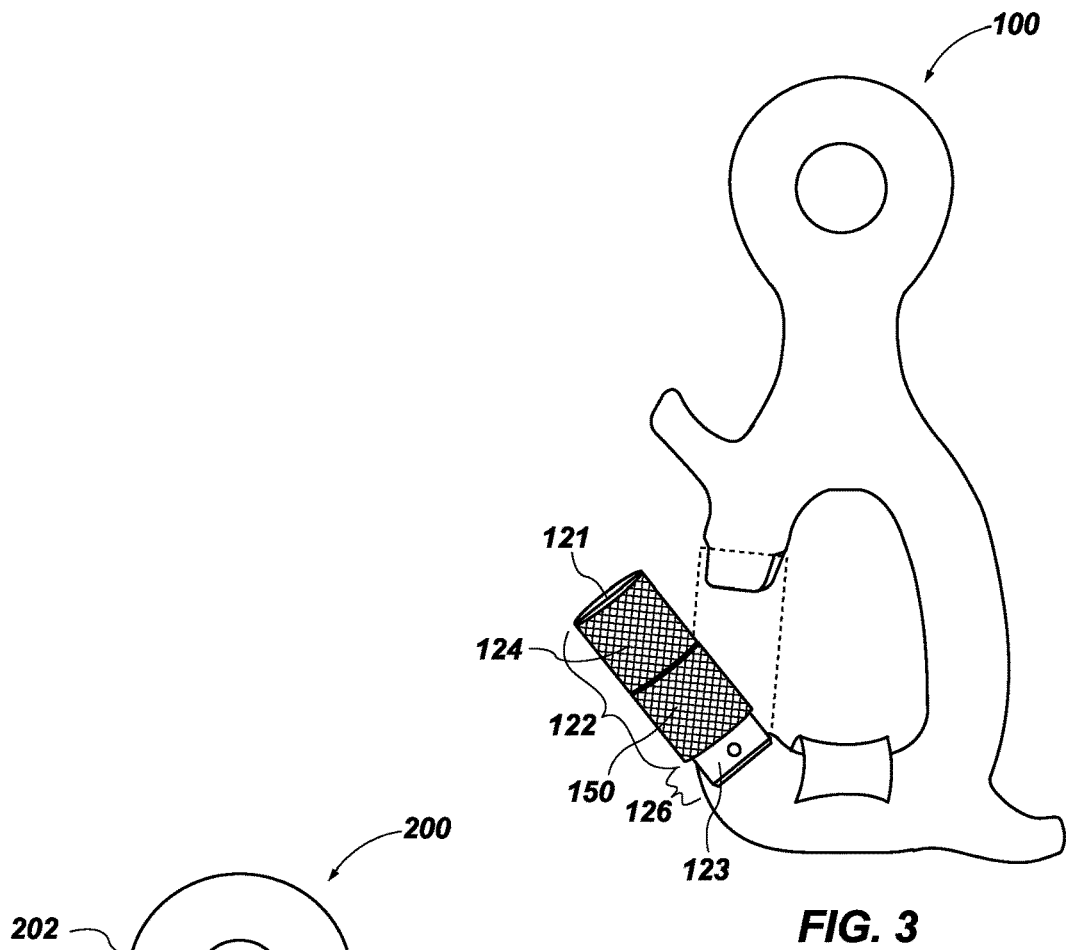
FIG. 3 is a top view of the tool of FIG. 1, in which the gate in a third, open, configuration.

FIGS. 1-3 illustrate an embodiment of a climbing/belay instrument 100. The instrument may be in the shape of a figure 8 with a first ring 102 and a second ring 104 connected by an intermediate section 106. However, it will be important to note that the instrument may form a plurality of other shapes that vaguely resemble a figure 8-like shape. For example, the first ring 102 may form a rectangle, and the second ring 104 may form a non-symmetrical oval in such a way that the instrument still generally resembles a figure 8. The intermediate section 106, or neck, may also be elongated so that the first ring 102 and the second ring 104 are more distant from one another than the ends would normally be in a traditional figure 8; however it will be appreciated that a standard designed figure 8 is also contemplated. The intermediate section 106 may also be shortened so that the first ring 102 and the second ring 104 are closer to one another than the ends would normally be in a figure 8 such that the ends are essentially connected to one another, which would essential make a portion of each of the first ring 102 and the second ring 104 part of each other via the intermediate portion 106.

In this particular embodiment, the first ring 102 of the instrument 100 may form a rounded rectangular shape, and the second ring 104 may form an irregular quadrilateral shape, which increases in width the farther it extends in the opposite direction of the intermediate section 106. The first ring 102 and the second ring 104 are connected to one another by the intermediate section 106 and extend out in opposite directions from one another and the intermediate section 106. The intermediate section 106 is elongated and decreases in width towards the middle, or central portion of the intermediate section 106, and increases in width where it connects to the first ring 102. Additionally the intermediate portion may also increase in width where it connects to the second ring 104. The first ring 102, the second ring 104, and the intermediate section 106 may comprise one uniform piece of material, such as a metal, or they may each comprise separate components that have been coupled to one another to form a unified body that define the general contours of the instrument 100. The rings may also be substantially circular and have similar or different radiuses of curvature to form larger or smaller rings.

The first ring may 102 may include a first aperture 110, or void, which may pass at least partially, if not entirely, through the body of the instrument 100. The second ring 104 may include a second aperture 114, or void, which may pass at least partially, if not entirely, through the body of the instrument 100. Each of the first aperture 110 and second aperture 114 may include a central axis and each may be substantially parallel to one another.

The instrument 100 may also comprise extensions 120, which may include one or more extensions. The extensions 120 may be located along a perimeter 112 of the instrument 100 at a plurality of positions, including for example, on the perimeter 112 around the second ring 104. The extensions 120 may extend out away from the instrument 100, extending out and away from a center of the second aperture 114. The extensions 120 may be curved, bent or straight, and they may resemble a barb, a hook, or a bar. The extension 120 may be used for various purposes related to climbing, by way of one example, attaching one's gear to the instrument 100 via the extension 120 with climbing rope by looping the rope around the extension 120 after passing through the second aperture 114.

The extensions 120 may comprise a plurality of extensions and be positioned in a plurality of locations along the perimeter of the second ring 104. The extensions 120 may also (or alternatively) be located on the perimeter 112 of the instrument 100 around outer portions of the first ring 102 in such a way that the extensions 120 may protrude out away from the instrument 100, extending out and away from a center of the first aperture 110. The extensions 120 may also be similarly located on the outer edges of the intermediate portion 106.

The instrument 100 may comprise a variety of different materials depending on the intended use thereof, including but not limited to, metals and alloys. By way of example and not limitation, the instrument 100 may comprise steel, aluminum, aluminum alloys, and plastic.

The instrument 100 may also comprise a gate 122. The gate may contain a first end 121 and a second end 123. The gate 122 may be coupled to the instrument 100 in such a way that it forms part of the second ring 104. In other words, the gate 122 may replace, or take the place of, an extended portion of the second ring 104. The second end 123 of the gate 122 may be pivotally fixed to the second ring 104 at a pivot 126, which may be a mechanical hinge. The first end 121 of the gate 122 may be reversibly secured to the second ring 104 in such a way that the first end 121 may be pivoted between a first configuration (as is illustrated in FIG. 1), and at least one of the following: a second open configuration (as is illustrated in FIG. 2) and a third open configuration (as is illustrated in FIG. 3).

FIG. 2 illustrates that the gate 122 may pivot from the pivot 126 between the first configuration and the second open configuration 140 in such a way that the gate 122 pivots inwardly into the second aperture 114. The gate 122 may also, or alternatively, pivot outward to the third open configuration 150 such that the gate pivots out away from the instrument 100 in the opposite direction of the second aperture 114.

The gate 122 may also comprise a locking mechanism 124, which may be used to lock the gate 122 while it is in a closed position and prevent it from opening in an unanticipated manner. The locking mechanism 124 may comprise various different form factors. By way of example, the locking mechanism 124 may require a user to twist the locking mechanism 124 and then pull it down toward the second end 123 of the gate 122 in order to release the gate 122 and shift it from the first configuration and the second open configuration (or the third open configuration depending on the intended use thereof). Another example of the locking mechanism 124 may comprise a different form factor, such as a triple lock mechanism on the gate 122, which may require the user to slide the triple lock mechanism axially toward the second end 123 of the gate 122, twist the triple lock mechanism, and then slide it axially toward the first end 121 of the gate 122 in order to open the gate 122.

The instrument 100 may also comprise a pulley system 130 that may be incorporated into the second ring 104. The pulley system 130 may include an elongated cylinder 132, which may be a pulley wheel, that transverses at least a portion of the second ring 104 in such a way that that the elongated cylinder 132 faces the center of the second aperture 114. The pulley system 130 may be fixed to the second ring 104 by any suitable means, including for example, via a cylindrical pin or shaft that extends through the center of the pulley system 130 into the second ring 104 on either side of the pulley system 130 so that the elongated cylinder 132 may rotate. The pin may be exposed on one end, or both ends, of the pulley system 130 and may be removable/replaceable. Alternatively the pin may be secured within the second ring 104 and the pulley system 130 and may not be accessible or removed. The pulley system 130 may be utilized for various purposes related to climbing, such as raising and lowering various types of loads with a climbing rope. For example, a user may choose to thread a climbing rope through the second aperture 114 and engage the pulley system 130 at the elongated cylinder 132 with the rope to hoist a load.

The second ring 104 may also comprise a reinforced member 134 of the second ring 104. The reinforced member 134 may be a strengthened portion of the second ring 104 that is located around an exterior portion of the second ring 104 approximating the pulley system 130 and or surrounding the edges of the pulley system 130. The reinforced member 134 may serve to reinforce or maintain the structural integrity of the instrument 100, and specifically the structural integrity of the second ring 104, while the instrument 100 is being used to hoist, carry, or transport heavy loads, such as hoisting materials up or down via the pulley system 130. In FIGS. 1-3, the reinforced member may be a thicker, strengthened, and or denser portion of the second ring 104 around where the second ring 104 approximates or surrounds the pulley system 130. However, it will be important to note that in other configurations, the reinforced member 134 may take various different forms. The reinforced member 134 may, for example, be a separate component that may be fixed to the second ring 104 and is situated around the portion of the second ring 104 that approximates or surrounds the pulley system 130.

Alternatively the pulley wheel 132 may comprise the entire reinforced portion 134 of the system 100. The pulley wheel 132 may completely encircle the entire end of the second ring 104.

Figure 4:
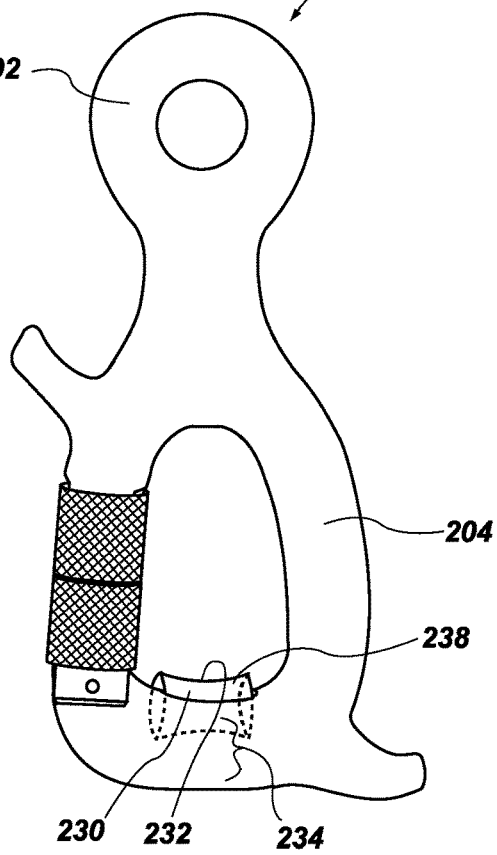
FIG. 4 is a top view of the tool of FIG. 1 with a pulley mechanism in cross section.

FIG. 4 illustrates an alternate embodiment of an instrument 200 which may be substantially similar to instrument 100. The instrument 200 may comprise a first ring 202, a second ring 204, a pulley system 230, an elongated cylinder 232, and a reinforced member 234. Corresponding numbers may be found in FIG. 1.

The pulley system 230 may be incorporated into the second ring 204 in such a way that the pulley system 230 is substantially sheltered within or contained within the second ring 204. In this embodiment, the only portion of the pulley system 230 that may be visible outside the instrument 200 is a portion of the elongated cylinder 232 with an exposed engageable portion 238 of the elongated cylinder 232. This may allow the reinforced member 234 on the second ring 204 to substantially surround or encompass the pulley system 230, which may serve to improve the overall structural integrity of the instrument 200 as a whole, particularly when the instrument 200 is being utilized to carry a heavy load. This embodiment may also improve the structural integrity of the pulley system 230, and allow for the pulley system 230 to be fixed within the body of the second ring 204 in a more secure manner.

Figure 5:
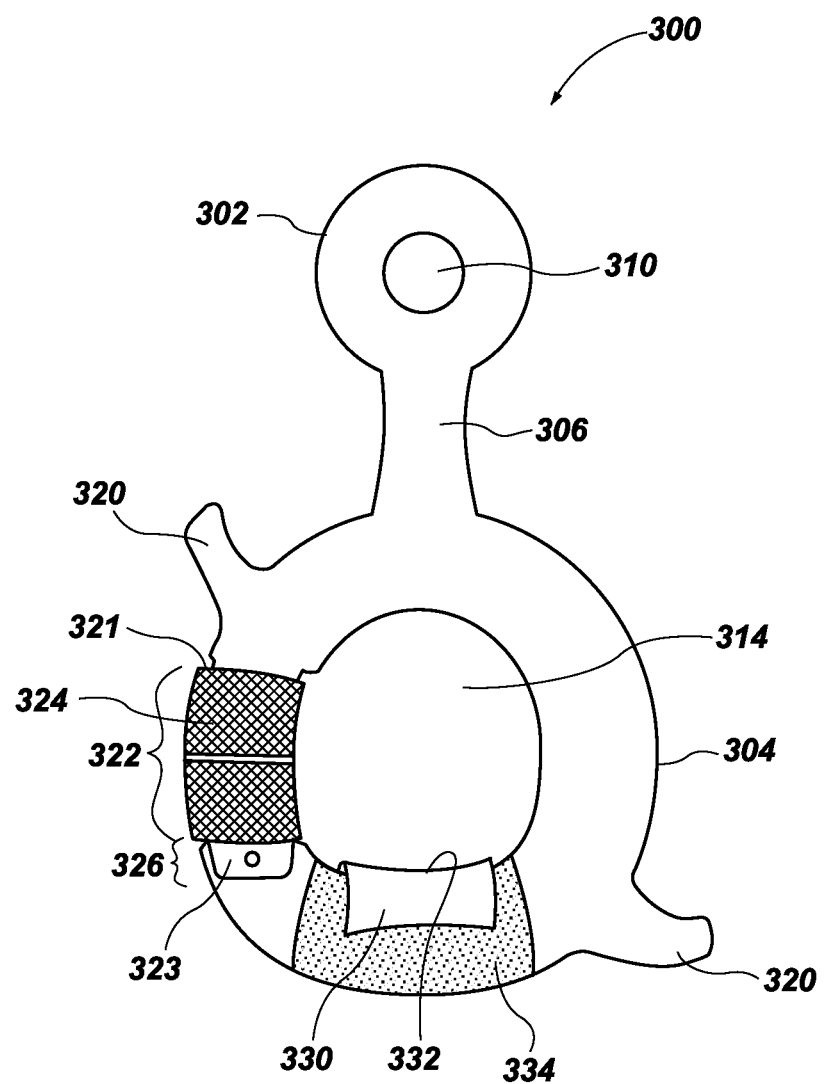
FIG. 5 is a top view of an alternate embodiment of the tool of FIG. 1 with a first ring, a second ring, an intermediate portion adjoining the two rings, a convex gate positioned on the first ring, and an integrated pulley system.

FIG. 5 illustrates an alternate embodiment of an instrument 300 which may be substantially similar to instrument 100. In this particular embodiment, however, a first ring 302, may form a small rounded shape, and a second ring 304, may form a larger rounded shape. The two rings may be connected to one another by an intermediate section 306, or neck, which in this embodiment, is further elongated than intermediate section 106. The intermediate section 306 decreases in width towards the middle and increases in width where it connects to the first ring 302 and the second ring 304. The instrument 300 may more closely resemble the contours of a traditional figure 8 climbing/belay tool.

The instrument 300 may also comprise the following elements: a first aperture 310, a second aperture 314, extensions 320 which may comprise one or more extensions, a pulley system 330 and an elongated cylinder 332. Corresponding numbers may be found in FIG. 1.

The instrument 300 may contain a convex gate 322 that may be rounded (in place of the gate 122 on instrument 100, which is more straight). The convex gate 322 may comprise a first end 321 and a second end 323. The convex gate 322 may be coupled to the instrument 300 in such a way that it forms part of the second ring 304. Put another way, the second ring 304 may be in the form of C-shaped incomplete ring, and the convex gate 322 may be coupled to the second ring 304 in such a way as to fill in the incomplete portion of the second ring 304 so that the second ring 304 (in conjunction with the convex gate 322) form a complete ring-like shape. The second end 323 of the gate 322 may be securely affixed to the second ring 304 at a pivot 326. The first end 323 of the gate 122 may be reversibly secured to the second ring 304 in such a way that the first end 321 may be pivoted between an open position and a plurality of closed positions.

The convex gate 322 may be curved in such a way that it conforms to the convex contours of the second ring 304. The convex gate 322 may also comprise a rounded or convex locking mechanism 324, which may be curved in such a way that it conforms to the shape of the convex gate 322. The convex gate 322 may contain various different forms of locking mechanisms, however. By way of example, the first end 321 of convex gate 322 may comprise a locking mechanism that may be straight. Having a straight locking mechanism that is shorter in length than the length of the convex gate 324 may allow the convex gate to maintain a generally convex or curved shape while still allowing the locking mechanism to comprise a lock that comprises a twisting action as a safeguard, such as the triple lock type of mechanism described previously herein.

Additionally, the instrument 300 may contain a reinforced member 334, which may be a separate and reinforced component that may be fixed to a portion of the second ring 304 that approximates or surrounds the pulley system 330.

Figure 6:
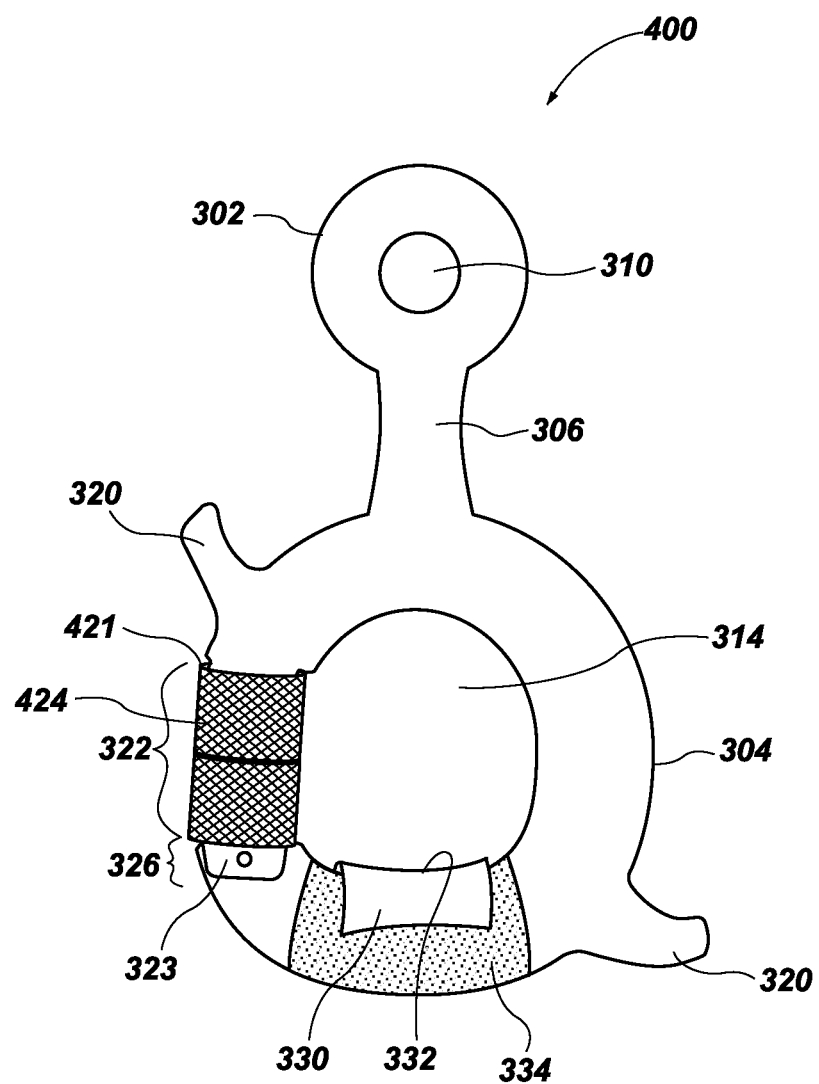
FIG. 6 is a top view of an alternate embodiment of the tool of FIG. 1 with a straight gate, and an integrated pulley system.

FIG. 6 illustrates an alternate embodiment of an instrument 400 which may be substantially similar to instrument 300. However, in this particular embodiment, the instrument 400 may contain a straight gate 424. The straight gate 424 may comprise a straight locking mechanism 421, which may traverse the length of the straight gate 424 or substantially all of the length of the gate 424. The straight nature of the straight gate 424 and the straight locking mechanism 421 may allow the straight locking mechanism 421 to comprise various different form factors, such as for example, a lock that comprises a twisting action as a safeguard, such as the triple lock type of mechanism described above.

Although the foregoing description contains many specifics, these should not be construed as limiting the scopes of the inventions recited by any of the appended claims, but merely as providing information pertinent to some specific embodiments that may fall within the scopes of the appended claims. Features from different embodiments may be employed in combination. In addition, other embodiments may also lie within the scopes of the appended claims. All additions to, deletions from and modifications of the disclosed subject matter that fall within the scopes of the claims are to be embraced by the claims.

What is claimed:

1. A climbing system comprising:
    a body resembling a figure 8 comprising;
        a first ring;
        a second ring adjacent to the first ring, the second ring comprising an opening; and
        an intermediate portion that connects that first ring to the second ring;
    a gate positioned within the second ring and traversing the opening, the gate comprising:
        a first end fixed to the second ring; and
        a second end reversibly secured to the second ring;
    wherein the first end of the gate is pivotably connected to the second ring and the second end of the gate is releasably connected to the second ring; and
    a pulley system at least partially integrated into the second ring, the pulley system fixed substantially within the second ring so that the pulley system is at least partially sheltered, or contained within, the second ring so that only a portion of a pulley wheel of the pulley system is exposed.

2. The system of claim 1 wherein the gate is toggleable between a first open configuration and a second closed configuration.

3. The system of claim 1, comprising at least one protrusion extending from a perimeter of the body.

4. The system of claim 3, wherein the at least one protrusion comprises a plurality of protrusions extending from a perimeter of the second ring opposite each other.

5. The system of claim 1, comprising a locking mechanism on the gate comprising:
    a locked configuration; and
    an unlocked configuration.

6. The system of claim 5, wherein the gate and its accompanying locking mechanism form a curved, convex shape that conforms to a contour of the second ring.

7. The system of claim 1, wherein the pulley system comprises
    a pulley wheel; and
    a cylindrical pin or shaft;
    wherein both ends of the cylindrical pin or shaft are housed within an instrument within the second ring, and the cylindrical pin or shaft extends through the center of the pulley wheel thereby allowing the pulley wheel to rotate.

8. The system of claim 1, further comprising a reinforced member on the second ring adjacent to the pulley system.

9. A climbing system comprising:
    a first ring;
    a second ring, larger than and engaged with the first ring, the second ring comprising:
        a gate traversing a portion of the second ring; and
        a rotatable cylinder positioned opposite the first ring and integrated within an interior portion of the second ring, the rotatable cylinder housed substantially within the second ring except for an exposed engageable portion of the rotatable cylinder.

10. The system of claim 9, comprising a plurality of curved protrusions connected to and extending out and away from at least one of the first ring and the second ring, the plurality of protrusions being positioned along an exterior perimeter of the system.

11. The system of claim 10, wherein the plurality of curved protrusions comprises two curved protrusions on opposite exterior portions of the second ring.

12. The system of claim 9, wherein the gate further comprises a locking mechanism that is toggleable between a locked position, which prevents the gate from opening unintentionally, and an unlocked position, which allows the gate to be pivoted between an open configuration and a closed configuration.

13. The system of claim 9, wherein the gate forms a curved, convex shape that conforms to a contour of the second ring.

14. The system of claim 9, further comprising a reinforced portion of the second ring, the reinforced portion being adjacent to and surrounding the rotatable cylinder.

15. A method of using a climbing system comprising:
    selecting a climbing instrument, the climbing instrument comprising:
        a first ring;
        a second ring, larger than and engaged with the first ring, the second ring comprising:
            a pivotable gate traversing a portion of the second ring; and
            a rotatable cylinder positioned opposite the first ring and integrated at least partially within an interior portion of the second ring, the rotatable cylinder housed substantially within the second ring except for an exposed, engageable portion of the rotatable cylinder;
    engaging the first ring with a first harness or a first rope;
    pivoting the gate from a closed configuration to an open configuration;
    engaging the second ring with a second harness or a second rope; and
    engaging the rotatable cylinder with the second harness or second rope to hoist, lift, or lower a load that is coupled the second harness or second rope.

16. The method of claim 15, wherein:
the climbing instrument further comprises:
- a first curved protrusion positioned on an external portion of the second ring; and
- a second curved protrusion positioned on another external portion of the second ring, the second curved protrusion being positioned opposite the first curved protrusion; and the method further comprises engaging at least one of the first curved protrusion and the second curved protrusion with at least one of the first harness, the first rope, the second harness, or the second rope.

* * * * *